UNITED STATES PATENT OFFICE.

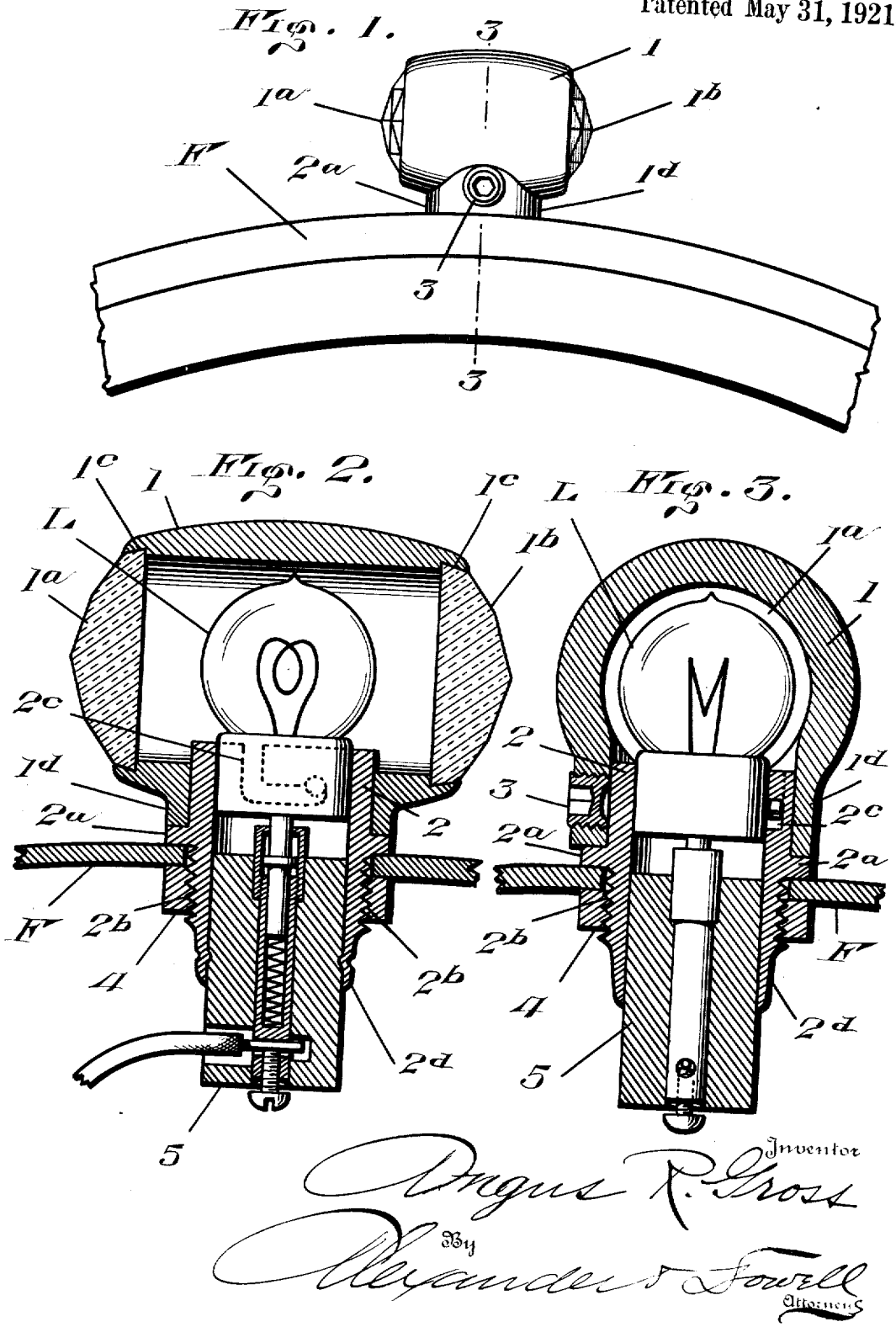

ANGUS R. GROSS, OF BALTIMORE, MARYLAND.

PARKING-LIGHT FOR AUTOMOBILES, &c.

1,380,058.  Specification of Letters Patent.  Patented May 31, 1921.

Application filed August 4, 1920. Serial No. 401,134.

*To all whom it may concern:*

Be it known that I, ANGUS R. GROSS, a citizen of the United States, residing at Baltimore, and State of Maryland, have invented certain new and useful Improvements in Parking-Lights for Automobiles, &c.; and I hereby declare that the following is a full, clear, and exact description thereof, reference being had to the accompanying drawings, which form part of this specification.

This invention is a novel fender light or "parking light," for use on automobiles and its object is to provide a small, effective electric light which can be readily attached to the fender of an automobile, or to other desired support, and does not require any skilled mechanician for so doing; and which light will be very simple in construction and will permit ready access to the lamp for removal thereof in case of breakage; and which can be readily taken down or set up.

In the accompanying drawings I have illustrated a light embodying the invention and will describe the same with reference thereto, and summarize in the claims the features for which protection is desired.

In the drawings:

Figure 1 is a full size side view of the light attached to a fender.

Fig. 2 is a greatly magnified longitudinal section thereof.

Fig. 3 is a magnified transverse section on line 3—3 Fig. 1.

The light practically comprises but three parts, a socket member 2 to be inserted through the fender; a nut 4 for fastening the socket member in position, and a light casing 1 which can be slipped onto the upper end of the socket member and secured thereto by a socket set screw.

The T-shaped casing 1, may be very diminutive, being shown full size in Fig. 1. It has fitted in its opposite ends red and white lenses 1ª and 1ᵇ, which are preferably faceted as shown so as to distribute the light rays emanating from the electric lamp L most effectively.

The ends of the casing 1 are preferably recessed as at 1ᶜ to receive the ends of the lenses 1ª, 1ᵇ and are turned in over the lenses to retain same therein, as indicated in Fig. 2.

The T 1ᵈ of the casing is adapted to fit upon the upper end 2 of the socket member, which is adapted to fit neatly within the T of the casing; and this socket member has an external flange 2ª below the part 2 upon which the T of the casing rests. When positioned on the socket member the casing is firmly secured thereto and in proper position thereon by means of a set screw 3, tapped through a threaded aperture in the side of the T 1ᵈ and engaging the part 2 of the socket member—see Fig. 3. Preferably this set screw is a socket-screw so that it may be operated by an angular wrench and does not have any head projecting from the T when the casing is fastened to the socket member.

The socket member also has a threaded portion 2ᵇ depending below the flange 2ª; and adapted to be inserted through an opening made in the fender or dash-board F of the vehicle, or at any point desired, and when so inserted the socket member is securely fastened in place by means of the nut 4 threaded onto the part 2ᵇ of the socket member below the fender; the socket member being securely clamped to the fender between the flange 2ª and the nut 4.

The socket member is provided with an internal key slot 2ᶜ at its upper end for the engagement of the key shank of an electric lamp L of usual construction, which needs no description herein. In the lower end of the socket member is inserted an insulating connector block 5, also of well known construction requiring no particular explanation herein, said block being firmly secured in the socket member, in any suitable way, as by pinching the lower thinned end 2ᵈ of the socket member upon the insulating connector block 5 as indicated in Fig. 2.

When the lamp L is inserted in the socket it makes electrical connection with the electric contact in the block 5 in the usual manner. The particular electric lamp used and the particular insulating block used may be purchased on the market, and be connected with the light circuit on the machine in the usual manner.

For a practical efficient light the casing 1 is only about one and one-half inches long and one inch in diameter, so that it is small and unobtrusive, and at the same time neat and attractive in appearance. The lenses 1ª, 1ᵇ afford most effective fore and aft light when the lamp L is burning. If the lamp L should burn out, or if it is desired to inspect the lamp L, it is only necessary to loosen the screw 4 lift the casing 1 off of the socket member, and remove, inspect, and replace the lamp in the socket, slip the casing back over the lamp, see that the casing is properly turned so that the lenses 1ª, 1ᵇ are properly located fore and aft, and then tighten the screw 4. The lamp is then ready for use.

Having described my invention, what I claim is:

1. In a parking light, a tubular supporting member having a bayonet slot in its upper end for engagement with the pin of a lamp shank, an exterior flange intermediate its ends adapted to rest upon the fender, and an externally threaded portion below the flange adapted to be inserted through a fender; a nut engaging said threaded portion below the fender and clamping the fender between the flange and nut; a small cylindrical casing open at its opposite ends and having a tubular T portion adapted to fit on and over the upper end of the tubular supporting member above the flange; lenses secured in the opposite ends of the casing; a socket screw tapped through the T portion of the casing and engaging the upper end of the socket member to fasten the casing thereto, the outer end of said socket screw being substantially flush with the exterior surface of the T; an insulating block fixedly secured in the lower end of the tubular support; and means in said block for making electrical contact with the contacts in the shank of a lamp when the latter is inserted in the upper end of the socket member; the parts being so proportioned that the lamp is approximately in axial alinement with both lenses, substantially as described.

2. In a parking light, a tubular supporting member having a bayonet slot in its upper end for engagement with the pin of a lamp shank, an exterior flange intermediate its ends adapted to rest upon the fender, and an externally threaded portion below the flange adapted to be inserted through a fender; a nut engaging said threaded portion and adapted to clamp the fender between the flange and nut; a small cylindrical casing open at its opposite ends and having a tubular T portion adapted to fit upon the upper end of the tubular supporting member above the flange; projecting multi-faceted lenses secured in the opposite open ends of the casing; a socket screw tapped through the T portion and engaging the upper end of the socket member to fasten the casing thereto, having a polygonal recess in its outer end, and the outer end of said screw being substantially flush with the surface of the T; an insulating block fixedly secured in the lower end of the tubular support, and means in said block for making electrical contact with the contacts in the lamp shank when the latter is inserted in the upper end of the socket member; the parts being so proportioned that the lamp is approximately in axial alinement with both lenses, substantially as described.

3. In a parking light, a tubular supporting member having its upper end formed with a bayonet slot for engagement with the pin of a lamp shank and having an integral exterior supporting flange adapted to rest upon the top of the fender; means for clamping the flange to a fender; a small T-shaped casing comprising a cylindrical body open at its opposite ends and a depending tubular T portion adapted to telescope over the upper end of the tubular supporting member above the flange; multi-faceted lenses secured in and projecting beyond each end of the casing; a socket screw for fastening the T portion of the casing to the upper end of the socket member the outer end of said screw being substantially flush with the exterior of the part in which it is threaded, an insulating block fixedly secured in the lower end of the tubular supporting member; and means in said block for making electrical contact with the contacts in the shank of a lamp when the latter is inserted in the upper end of the socket member, the parts being so proportioned that the lamp is approximately in axial alinement with both lenses, substantially as described.

In testimony that I claim the foregoing as my own, I affix my signature.

ANGUS R. GROSS.